United States Patent [19]
Brownhill et al.

[11] 3,952,849
[45] Apr. 27, 1976

[54] SPRAG CLUTCHES

[75] Inventors: Edward Joseph Brownhill, Cheadle; Roy Heaton, Timperley; Ralph Booth, Gatley, Cheadle, all of England

[73] Assignee: Renold Limited, Manchester, England

[22] Filed: May 12, 1975

[21] Appl. No.: 576,654

[30] Foreign Application Priority Data
May 28, 1974 United Kingdom............... 23531/74

[52] U.S. Cl. .............................. 192/41 A; 192/45.1
[51] Int. Cl.² ......................................... F16D 41/07
[58] Field of Search......................... 192/41 A, 45.1; 188/82.8

[56] References Cited
UNITED STATES PATENTS

| | | | |
|---|---|---|---|
| 3,006,447 | 10/1961 | Irwin................................. | 192/45.1 |
| 3,598,212 | 8/1971 | Giese................. | 192/45.1 |
| 3,651,908 | 3/1972 | Oldfield........................... | 192/41 A |

*Primary Examiner*—Allan D. Herrmann
*Attorney, Agent, or Firm*—Flynn & Frishauf

[57] ABSTRACT

A sprag clutch utilising the principles of U.S. Pat. No. 3,651,908 has an improved energising spring arrangement in which the individual sprag energising springs are mounted on intermediate portions of bars forming part of the sprag retainer assemblage. The bars define with end ring parts of the retainer, separate compartments, one for the outer end of each sprag, end portions of the bars acting to position the sprags circumferentially, and the energising springs extend inwardly from the bars. The arrangement allows more sprags to be accommodated in a given diameter and, conveniently, the retainer is made in two identical annular parts which clip together.

15 Claims, 11 Drawing Figures

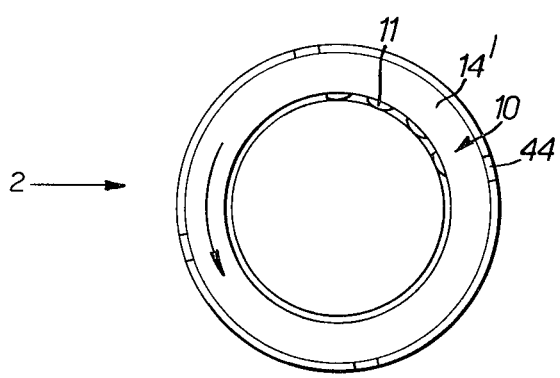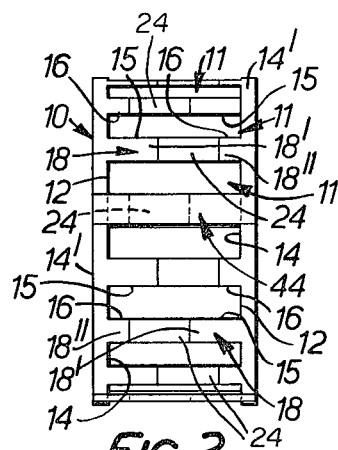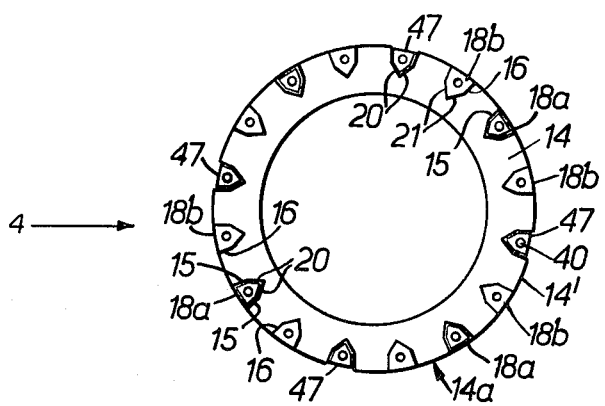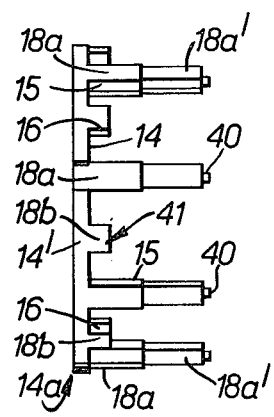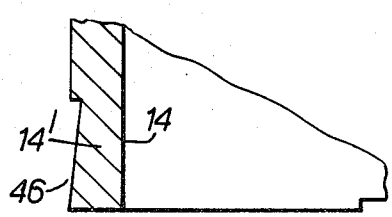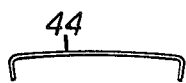

SPRAG CLUTCHES

This invention relates to sprag clutches and concerns sprag retainer assemblies therefor.

In our U.S. Pat. No. 3,651,908, we describe a sprag retainer assemblage for use in an annular gap defined between confronting cylindrical surfaces of inner and outer races of a sprag clutch to transmit uni-directional drive between the clutch driving and driven race. The assemblage comprises an annular sprag retainer, a ring of sprags in the retainer, and, for each sprag, an energising spring individual to the sprag and comprising a spring arm for biasing the sprag into substantially line contact with the inner race of the clutch, by tilting the sprag about substantially a line of contact with the outer race of the clutch.

The spring arm biases the sprag with a component of spring force directed radially inwardly of the assemblage the centre of gravity of each sprag being disposed close to or in the radial axial plane of the assemblage containing said line of contact between said sprag and the outer race.

The centrifugal force acting on the spring arm during overrunning of the outer race of the clutch, in use of the assemblage, relieves the spring force on the sprag, and the centrifugal force acting on the sprag during overrunning of the outer race of the clutch acts in conjunction with the spring force on the sprag so as to maintain a small load between the sprag and the inner race on overrun of the outer race, at least within a predetermined limit of outer race overrunning speed.

This construction gives rise to an improved clutch outer race overrunning speed compared with its inner race overrunning speed for which a clutch may be designed.

An object of this invention is to provide a sprag retainer assemblage for a sprag clutch which can retain this advantage whilst exhibiting an improved manner of mounting the energising springs so as to take up less circumferential space in the assemblage whereby more sprags can be accommodated at a given diameter and the torque capacity of a clutch thereby improved.

SUMMARY OF THE INVENTION

Thus, the present invention is directed to a sprag retainer assemblage as defined in the second paragraph of this specification in which the sprag retainer comprises axially extending bars having first lengthwise portions presenting sprag positioning faces acting to position the sprags circumferentially with respect to one another, and wherein each energising spring has a mounting portion at least in part enwrapping a further lengthwise portion of one of the bars, the mounting portion thereby mounting the energising spring fixedly on the bar.

Conveniently, the retainer is formed in two identical annular parts which are joined together, the springs of each pair of adjacent energising springs being mounted one on one of the annular parts of the retainer and the other on the other of the annular parts of the retainer.

This invention also comprehends a sprag clutch comprising inner and outer races and at least one sprag retainer assemblage according to this invention, as hereinbefore defined, disposed in an annular gap between the races and arranged to transmit a uni-directional drive between the clutch driving and driven race.

BRIEF DESCRIPTION OF THE DRAWINGS

The foregoing and still further features of this invention will become clear from a consideration of the following description of specific embodiments of sprag retainer assemblage according to this invention and a sprag clutch which embodies the assemblage, which will now be described, by way of example, and not by way of limitation, with reference to the accompanying drawings in which:

FIG. 1 is a front elevation of a sprag retainer assemblage according to the invention, FIG. 2 is a view in the direction of arrow 2 in FIG. 1, FIG. 3 is a view corresponding with FIG. 1 and showing one half of the sprag retainer of the assemblage, FIG. 4 is a view in the direction of arrow 4 in FIG. 3, FIG. 5 is a partial cross-sectional view of one half of the sprag retainer of the assemblage showing a detail of its construction, FIG. 6 shows one of the spring clips used to hold the two halves of the sprag retainer together in assembled relation.

DETAILED DESCRIPTION

Figure 7:
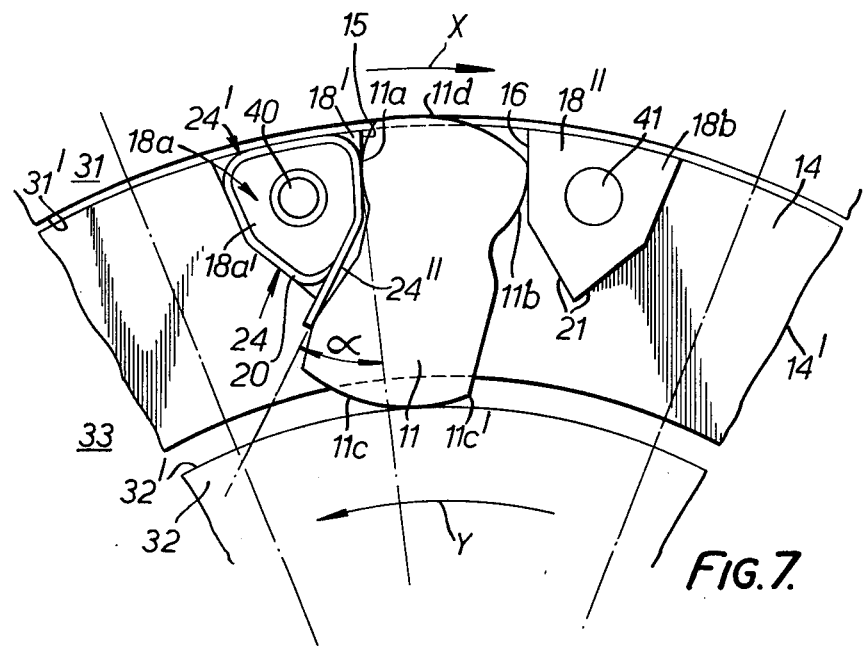
FIG. 7 is an enlarged view of part of a sprag clutch of this invention in the outer race overrunning condition and showing the sprag retainer with one sprag and energising spring in position, between the confronting cylindrical surfaces of the inner and outer races of the clutch.

Referring to the accompanying drawings, the assemblage of FIG. 1 comprises an annular sprag retainer generally indicated at 10 in FIGS. 1 and 2, and a ring of identical sprags 11 each having its radially outer end confined in a separate compartment 12 of the retainer defined between axially spaced annular end walls 14 on end ring parts 14' of the retainer and axially directed retainer bars 18 extending axially between, and connected with, the end ring parts.

Adjacent bars 18 have lengthwise portions 18' and 18'', one towards each end, presenting towards the radial outer periphery of the end walls 14, parallel, confronting flat faces 15, 16 which co-operate with oppositely facing curved surface portions 11a, 11b (see FIGS. 7 and 8) of the sprag at the radially outer end of the sprag to position the sprag circumferentially with respect to all the other sprags and to maintain the sprag with its tilt axis parallel with the axis of the assemblage, and, radially inwardly of the faces 15, 16 further flat, opposed, radially equally inwardly directed faces 20 and 21 which act to prevent "turnover" and "pop out" of the sprag in use of the assemblage. Thus, the faces 20 and 21 limit tilting of the sprag in one direction or the other, beyond a position in which it can move out of engagement with the clutch inner and outer races.

The faces 20 or 21 on opposite sides of each bar 18 intersect one another and also the face 15 or 16 on the same side of the bar, all the bars being of uniform cross-sectional shape and dimensions throughout their lengthwise portions 18' and 18'' which portions are symmetrical about radial planes through the lines of intersection of their faces 20 or 21. This configuration of the bars 18 enables the retainer to be formed in two identical annular parts 14a one of which is shown in FIGS. 3 and 4. Thus, each bar 18 has two endwise abutting parts 18a and 18b respectively one on each of the parts 14a. Each longer part 18a has a lengthwise portion 18a' at its free end, generally of the same cross-sectional shape as the lengthwise portions 18' and 18'' but the faces of which are inset with respect to the corresponding faces of the portions 18' and 18'' by an amount which is a little greater than the thickness of a spring metal strip mounted on the portion 18a' and forming a sprag energising spring 24 (see also FIGS. 7 and 8). The axial length of each portion 18a' is equal to the width of the strip forming the spring.

Figure 8:
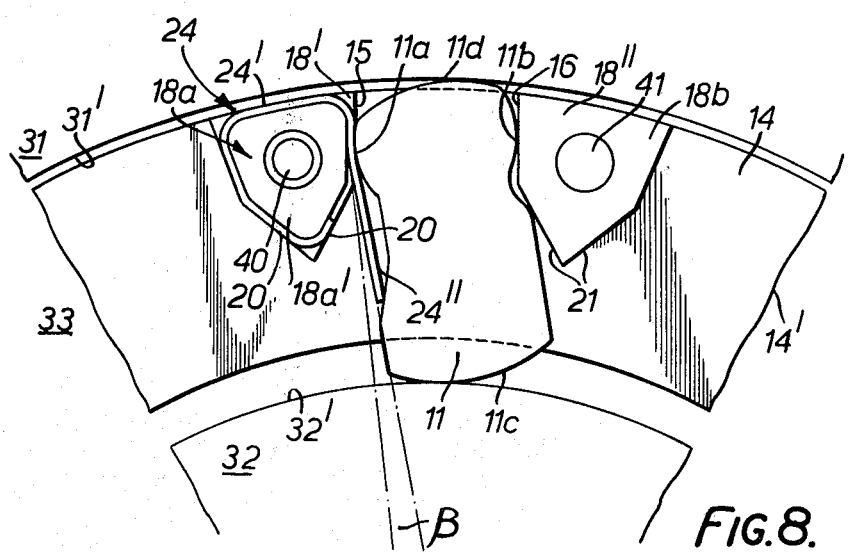
FIG. 8 is a view corresponding with FIG. 7 but showing the clutch in its fully loaded condition.

In FIGS. 7 and 8 outer and inner races are indicated at 31 and 32 respectively with an annular gap 33 defined between their confronting cylindrical surfaces 31' and 32'.

The sprag retainer assemblage is positioned in the gap 33 with the sprags 11 positioned circumferentially and correspondingly tilted with respect to the radial directions, initially, with the races stationary, generally in the attitude depicted for the single sprag 11 which is shown in FIG. 7.

The radially inner and outer end faces 11c and 11d of the sprags are shaped by radii or compound radii, and the initial tilt of the sprags is such that the radially inner end face of each sprag has one lower corner 11c'. (See FIG. 7). The overall shape of the sprags is such that as the sprags tend to assume a more exactly radial disposition between the races, the overall height of the sprags increases and tends to become greater than the width of the gap 33 so that the sprags lock solidly between the races to transmit drive from the driving race to the driven race.

The springs 24, one for each sprag, energise or bias the sprags lightly into contact with the inner and outer races when the races are stationary so that such drive may be taken up.

Each spring 24 has a mounting portion 24' having a straight sided shape conforming in shape to, and closely enwrapping the portion 18a' of one of the bars 18, the mounting portion in this way holding a straight blade spring portion 24'' of the spring in a predetermined inwardly projecting position, with its inner free end engaging and energising one of the sprags 11.

Whilst the mounting portion 24' is shown completely enwrapping the portion 18a' in this example, this is not essential. A partial enwrapping, sufficient to support the portion 24'' in a fixed angular orientation in its undeflected state is all that is necessary.

In its deflected state, each blade spring portion 24'' extends inwardly at an angle to the radial direction so that it exerts an energising force on its sprag, in the gap 33, with a component directed radially inwardly of the races.

The energising force biases the radially inner end face 11c of the sprag into substantially line contact with the inner race, the energising force tending to tilt the sprag about substantially a line of contact between the radially outer end face 11d of the sprag and the outer race 31 in the same way as is described in the specification of our U.S. Pat. No. 3,651,908.

On overrun of the outer race, in the direction of arrow X (see FIG. 7), the action of centrifugal force on the blade spring portion 24'' relieves the spring force on the sprag, thus reducing the rubbing load between the sprag and the inner race.

The centre of gravity of the sprag may be positioned such that the action of the centrifugal force on the sprag increases this rubbing load between the sprag and the inner race to an extent in whole or in part compensated for by the reduction of rubbing load due to the action of the centrifugal force on the blade spring portion so that the action of the centrifugal force on the sprag has no effect on or acts to reduce the rubbing load between the sprag and the inner race, the criterion being however that the sprag remains spring biased into contact with the inner race under all outer race overrunning conditions for which a clutch may be designed.

In order to locate the retainer parts 14a correctly with respect to one another, the endwise abutting bar parts 18a and 18b have spiggot and socket connections 40, 41. The parts 14a are held together by four spring clips 44 of generally U-shaped configuration, one of which is shown in FIG. 6, the clips embracing the outer circumferential edge of the retainer. The annular end rings of the retainer parts are circumferentially recessed as at 46 (see FIG. 5) at the outer peripheral edge of their outside faces to receive these clips, the clips being circumferentially located each in a pair of axially directed recesses 47 one in each of the end walls 14 and being received flush against the outer surface of one of the bars 18, which has a lesser radial thickness in order to accommodate the clip.

The retainer parts are conveniently formed as plastics mouldings from nylon loaded with glass fibre and graphite to provide strength and thermal stability. Other suitable materials may however be used.

The sprags are of uniform cross-section througout and have plane end faces one adjacent each of the walls 14 of the sprag retainer.

The energising spring arrangement described, with the spring mounting portions enwrapping lengthwise portions of the retainer bars 18, takes up less circumferential space than the spring mounting arrangements described in our U.S. Pat. No. 3,651,908. More sprags can therefore be accomodated at a given diameter whereby the torque capacity of a clutch can be increased.

The springs 24 are assembled simply by pushing their mounting portions onto the free ends of the bar portions 18a' of the two retainer parts, the springs on one part being laterally inverted in relation to the springs on the other part. Alternate sprags are then inserted in position in the retainer parts one in engagement with each spring blade. The two retainer parts are then assembled to form the sprag retainer assemblage, the retainer parts being secured together by means of the clips.

As assembled the springs 24 are located axially of the retainer bars by the shoulders formed at the junction of the portions 18' and 18a' and 18a' and 18b respectively.

The staggered arrangement taken up by the energising springs in the final assemblage permits the retention of confronting cage faces 15, 16 on lengthwise portions of adjacent retainer bars 18 at each end of each sprag whilst allowing the retainer to be manufactured in two identical parts. This represents a further significant manufacturing advantage.

The spring mounting portions 24' enwrapping the bars 18 lie below the level of the face 15, 16 where they confront the surface portions 11a and 11b of the sprags, and these spring mounting portions are, therefore, protected from wear by the sprags, the wear being taken at the faces 15 and 16.

Each blade spring portion 24" extends inwardly at an angle α to the radial direction in the outer race overrunning condition. The angular deflection of the blade spring portion is then greater than α + β where β is the angle which the spring arm makes with the radial direction in the fully loaded condition of the clutch. (See FIG. 8). In the outer race overrunning position, as shown in FIG. 7, the blade spring portion exerts an energising force on the sprag, in the gap 33 between the races 31 and 32, with a component directed radially inwardly of the races as already stated. In the fully loaded condition, the blade spring portion exerts an energising force on the sprag, in the gap between the races, with a component directed radially outwardly of the races. In a predetermined, intermediate load condition, the blade spring portion extends radially inwardly and exerts an energising force on the sprag in a tangential direction in the gap between the races. At this predetermined, intermediate load condition the spring energising force has a zero radially inwardly directed component. Above the predetermined, intermediate load condition the spring energising force has a radially outwardly directed component which increases with load.

It is to be understood that when the inner race overruns, it rotates in the direction of arrow Y (see FIG. 7) and the sprags and the outer race remain stationary. When the outer race overruns, in the direction of arrow X, it takes with it the sprags and the sprag retainer, only the inner race remaining stationary.

As may be seen from FIG. 8 in the fully loaded position of the clutch in which the blade spring portion extends at an angle β to the radial direction such as to exert its energising force on the sprag with a component directed radially outwardly of the races, the action of the centrifugal force on the blade arm reinforces the spring energising force acting on the sprag, and this condition applies in the whole of the upper part of the load range in which the angle β is greatr than zero.

Figure 9:
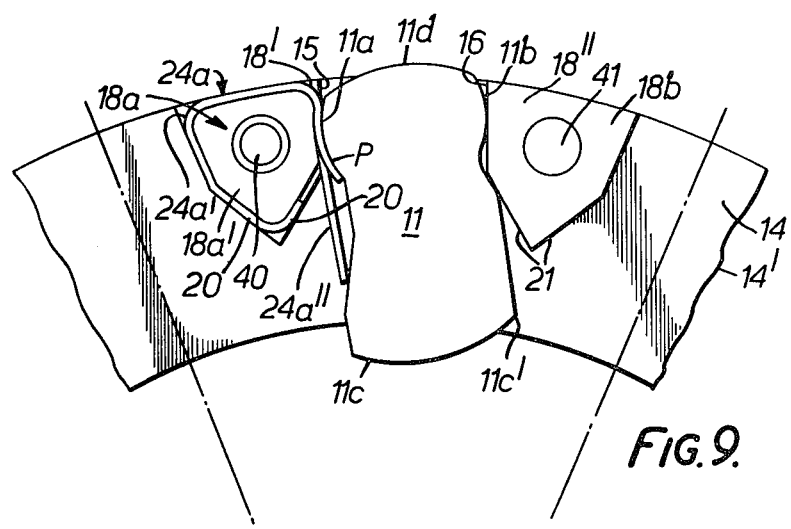
FIG. 9 is an enlarged view of part of a further sprag retainer assemblage according to the invention.
Figure 11:
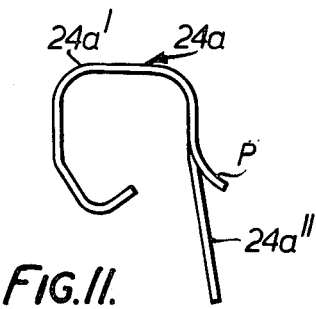
FIGS. 10 and 11 are details of the assemblage shown in FIG. 9.
Figure 10:
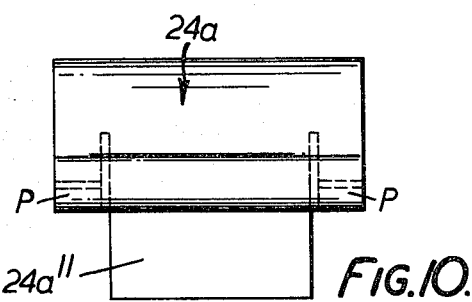

FIGS. 9, 10 and 11 show a modification of the sprag retainer assemblage in which each energising spring 24a has ears P one at each side of its blade spring portion 24a" corresponding with the blade spring portion 24" previously described and carried by the mounting portion 24' corresponding with the mounting portion 24' previously described. The ears P engage with the curved surface portions 11a of the sprags to restrain the sprags against radial inward movement in the sprag retainer when the assemblage is free of any races. In this condition, each sprag is held by its energising spring against the next adjacent bar 18 the face 20 or 21 of which restrains the sprag against radial outward movement relative to the sprag retainer. Because of these restraints, the sprag retainer assemblage may be freely handled prior to fitting it between a pair of races, or directly onto a shaft for example.

The ears P are preferably curved in conformity with the surface portions 11a of the sprags.

FIGS. 10 and 11 show one of the energising springs 24a in a non-deflected condition. Although the ears P exert some spring force on the sprags in the assembled condition of the springs, the dimensions of the ears are such that this spring force is of no practical significance.

Parts in FIG. 9 corresponding with parts already described with reference to earlier figures, are indicated by the same reference numerals as used previously.

By staggering the springs 24, wider springs may be incorporated, using the mounting arrangement described, with adjacent springs being carried on identical annular parts 14a respectively. Far narrower springs 24 could however be employed since the stiffness of the springs is their sole criterion. Using narrower springs, all the springs 24 could be arranged centrally of the bars 18 if desired; the retainer still being formed in two identical annular parts having the construction of the parts 14a. For example, the width of the springs could be limited to a dimension equal to the overlap of the springs 24 shown in FIG. 2, the axial length of the portions 18a' being correspondingly reduced and the axial length of the lengthwise bar portions 18" being correspondingly increased.

We claim:

1. In a sprag retainer assemblage for use in an annular gap defined between confronting cylindrical surfaces of inner and outer races of a sprag clutch to transmit uni-directional drive between the clutch driving and driven race, the assemblage comprising an annular sprag retainer, a ring of sprags in the retainer, and for each sprag, an energising spring individual to the sprag and comprising a spring arm for biasing the sprag into substantially line contact with the inner race of the clutch, by tilting the sprag about substantially a line of contact with the outer race of the clutch, an improved sprag retainer comprising axially extending bars having first lengthwise portions presenting sprag positioning faces acting to position the sprags circumferentially with respect to one another, and wherein each energising spring has a mounting portion at least in part enwrapping a further lengthwise portion of one of the bars, the mounting portion thereby mounting the energising spring fixedly on the bar.

2. A sprag retainer assemblage as claimed in claim 1 wherein the radially outer ends of the sprags are confined each in a separate compartment of the retainer defined between axially spaced annular end walls on end ring parts of the retainer and sprag positioning faces on an adjacent pair of said bars, said bars extending axially between, and being connected with, said end ring parts, and the spring arms extend inwardly from said bars.

3. A sprag retainer assemblage as claimed in claim 2 wherein the bars of each adjacent pair of said bars have first lengthwise portions, one towards each end, presenting, towards the radial outer periphery of the adjacent one of said end walls, parallel, confronting, flat, sprag positioning faces which co-operate with oppositely facing curved surface portions of one of the sprags, at the radially outer end of the sprag, to position the sprag circumferentially with respect to all the other sprags and to maintain the sprag with its tilt axis parallel with the axis of the sprag retainer assemblage.

4. A sprag retainer assemblage as claimed in claim 3 wherein the first lengthwise portions of the bars of each adjacent pair of said bars have, radially inwardly of said sprag positioning faces, further flat, opposed radially equally inwardly directed tilt limiting faces which act to limit tilting of the sprag positioned by the sprag positioning faces of the bars.

5. A sprag retainer assemblage as claimed in claim 4 wherein the tilt limiting faces on opposite sides of each of said bars intersect one another and also the sprag positioning faces on the bar, all the bars being of uniform cross-sectional shape and dimensions throughout the first lengthwise portions thereof which portions are symmetrical about radial planes through the lines of intersection of their tilt limiting faces.

6. A sprag retainer assemblage as claimed in claim 1 wherein each energising spring has an ear carried by its mounting portion and engaging the curved surface portion of the sprag energised by the spring on the side of the sprag adjacent the spring to restrain the sprag against radial inward movement in the sprag retainer when the assemblage is free of any races, the spring then holding the sprag in engagement with its tilt limiting faces on the bar on the side of the sprag remote from the spring to restrain the sprag against radial outward movement in the sprag retainer.

7. A sprag retainer assemblage as claimed in claim 1 wherein the retainer is formed in two identical annular parts which are joined together, the springs of each pair of adjacent energising springs being mounted one on one of the annular parts of the retainer and the other on the other of the annular parts of the retainer.

8. A sprag retainer assemblage as claimed in claim 7 wherein each bar has two endwise abutting parts one of which is longer than the other, the parts of the bar being formed in one piece respectively with the two annular parts of the retainer.

9. A sprag retainer assemblage as claimed in claim 8 wherein said further lengthwise portion of each bar is formed as a lengthwise portion at the free end of said longer part of the bar.

10. A sprag retainer assemblage as claimed in claim 9 wherein said further lengthwise portion of each bar is generally of the same cross-sectional shape as said first lengthwise portions thereof but has its faces inset with respect to the corresponding faces of the first lengthwise portions by an amount which is a little greater than the thickness of the mounting portion of the energising spring enwrapping said further lengthwise portion.

11. A sprag retainer assemblage as claimed in claim 10 wherein the energising springs are disposed in staggered relation.

12. A sprag retainer assemblage as claimed in claim 8, wherein the two endwise abutting parts of each bar have a spigot-and-socket connection with one another.

13. A sprag retainer assemblage as claimed in claim 7 wherein the two identical annular parts of the retainer are held together by spring clips.

14. A sprag retainer assemblage as claimed in claim 13 wherein the spring clips are of U-shaped configuration and each embraces the outer circumferential edge of the retainer between an adjacent pair of said sprags, the clip being circumferentially located in a pair of recesses one in each of the two retainer parts.

15. A sprag clutch comprising inner and outer races and at least one sprag retainer assemblage disposed in an annular gap between the races and arranged to transmit a uni-directional drive between the clutch driving and driven race, the assemblage comprising an annular sprag retainer, a ring of sprags in the retainer, and for each sprag, an energising spring individual to the sprag and comprising a spring arm for biasing the sprag into substantially line contact with the inner race of the clutch, by tilting the sprag about substantially a line of contact with the outer race of the clutch, the sprag retainer comprising axially extending bars having first lengthwise portions presenting sprag positioning faces acting to position the sprags circumferentially with respect to one another, and wherein each energising spring has a mounting portion at least in part enwrapping a further lengthwise portion of one of the bars, the mounting portion thereby mounting the energising spring fixedly on the bar.

* * * * *